(12) United States Patent
Kesler

(10) Patent No.: US 11,873,936 B2
(45) Date of Patent: Jan. 16, 2024

(54) FEATURE FOR SAFEGUARDING FASTENER CLAMP-LOAD ON METAL SEAL

(71) Applicant: Hanon Systems, Daejeon (KR)

(72) Inventor: Eric Kesler, Northville, MI (US)

(73) Assignee: HANON SYSTEMS, Daejeon (KR)

( * ) Notice: Subject to any disclaimer, the term of this patent is extended or adjusted under 35 U.S.C. 154(b) by 130 days.

(21) Appl. No.: 17/404,453

(22) Filed: Aug. 17, 2021

(65) Prior Publication Data
US 2023/0059749 A1 Feb. 23, 2023

(51) Int. Cl.
F25B 41/40 (2021.01)
F16L 23/18 (2006.01)
F16L 41/08 (2006.01)

(52) U.S. Cl.
CPC ............. *F16L 41/086* (2013.01); *F16L 23/18* (2013.01); *F25B 41/40* (2021.01)

(58) Field of Classification Search
CPC ....... F16L 23/032; F16L 23/18; F16L 41/001; F16L 41/086; F25B 41/40
See application file for complete search history.

(56) References Cited

U.S. PATENT DOCUMENTS

| 9,261,194 | B2* | 2/2016 | Kesler | F16L 41/086 |
| 2003/0080554 | A1* | 5/2003 | Schroeder | F16L 23/18 |
| 2007/0273102 | A1* | 11/2007 | Schroeder | F16L 41/086 |
| 2011/0214755 | A1 | 9/2011 | Kesler et al. | |
| 2015/0115603 | A1* | 4/2015 | Trombley | F16L 23/18 |
| 2017/0059064 | A1* | 3/2017 | Thrift | F16L 23/18 |
| 2018/0010719 | A1* | 1/2018 | Kesler | F16L 23/032 |
| 2020/0047592 | A1 | 2/2020 | Kesler et al. | |
| 2020/0158270 | A1* | 5/2020 | Liu | F16L 23/18 |
| 2020/0200307 | A1* | 6/2020 | Kesler | F16L 23/032 |
| 2022/0042626 | A1* | 2/2022 | Wang | F16L 23/032 |

FOREIGN PATENT DOCUMENTS

| DE | 10261887 A1 | 7/2004 | |
| EP | 2365260 A2 * | 9/2011 | ............ F16L 41/086 |
| JP | H0463885 A | 2/1992 | |

* cited by examiner

*Primary Examiner* — Zachary T Dragicevich
(74) *Attorney, Agent, or Firm* — Shumaker, Loop & Kendrick, LLP; James D. Miller

(57) ABSTRACT

A block fitting assembly includes a first block, a second block, and a first sealing element disposed between the first block and the second block. A clamping device applies a clamping force for compressing the first sealing element between the first block and the second block in an axial direction of the block fitting assembly. A first heel structure projects axially from one of the first block or the second block and projects towards the other of the first block or the second block. The first heel structure is configured to be spaced apart from or to contact the other of the first block or the second block depending on a temperature of the first block.

20 Claims, 8 Drawing Sheets

US 11,873,936 B2

FEATURE FOR SAFEGUARDING FASTENER CLAMP-LOAD ON METAL SEAL

FIELD OF THE INVENTION

The invention relates to a block fitting assembly for a vehicle air conditioning system, and more particularly, to a block fitting assembly for an expansion valve configured to maintain a desired clamping force throughout a range of operating temperatures corresponding to different degrees of thermal expansion of the block fitting assembly.

BACKGROUND OF THE INVENTION

Air conditioning systems for use in motor vehicles utilize a refrigerant that is circulated through a corresponding refrigerant circuit including components such as an evaporator, an expansion valve, a condenser, and a compressor. Such refrigerant circuits often employ block fitting assemblies for forming a fluid-tight seal at each position within an associated refrigerant circuit wherein the refrigerant is fluidly communicated from one component of the refrigerant circuit to another. The block fitting assemblies typically include at least a first block configured to mate with a second block, wherein the first block may be considered a male block while the second block may be considered a female block. The first and second blocks typically include aligned apertures for receiving a threaded fastener such as a stud or bolt therethrough, wherein the threaded fastener is configured to couple the first block to the second block while also supplying a sufficient clamping force to a sealing element of the block fitting assembly disposed between a sealing portion of the first block and a sealing portion of the second block. In many circumstances, the first block or the second block may be integrated into or form a portion of a component or assembly to which a fluid line is connected, wherein the other of the first block or the second block may be associated with an end portion of the fluid line.

It is common for the blocks of such block fitting assemblies to be formed from a material that is different from a material from which the threaded fastener of the corresponding block fitting assembly is formed. For example, it is common for the blocks of such assemblies to be formed from aluminum and alloys thereof, whereas the threaded fasteners of such assemblies are typically formed from steel. The use of different materials in forming the blocks and the associated fastener can lead to situations wherein different portions of the block fitting assembly are subjected to different degrees of thermal expansion during operational use of the component associated with the block fitting assembly, which in some circumstances can negatively affect the sealing ability of the corresponding block fitting assembly.

For example, one representative circumstance where it has been discovered that the differing thermal expansion of the blocks and the associated fastener may reduce a sealing capability of the corresponding block fitting assembly is disclosed in FIGS. 1 and 2, which illustrate an exemplary dual-port electronic expansion valve assembly 1. The expansion valve assembly 1 includes a first block 3 representative of a housing of the electronic expansion valve with the first block 3 defining each of a first passageway 4 and a second passageway 5 therethrough. As shown schematically, each of the passageways 4, 5 may include a corresponding expansion element 6 for selectively changing a cross-section across each of the respective passageways 4, 5.

The first block 3 is configured to cooperate with each of a second block 12 and a third block 13 at opposing axial ends thereof to form an assembly of the blocks 3, 12, 13. Each of the outer disposed blocks 12, 13 may be associated with fluidly coupling the passageways 4, 5 of the first block 3 to corresponding fluid lines of the refrigerant circuit. The blocks 3, 12, 13 include aligned fastener apertures 8 extending axially therethrough with the aligned fastener apertures 8 configured to receive a threaded fastener 9 therethrough. The first block 3 may be formed from a first material having a first coefficient of thermal expansion and the threaded fastener 9 may be formed from a second material having a second coefficient of thermal expansion, wherein the first coefficient of thermal expansion is greater than the second coefficient of thermal expansion. A pair of first sealing elements 15 is disposed between the first block 3 and the second block 12 and a pair of second sealing elements 16 is disposed between the first block 3 and the third block 13. At least a portion of each of the sealing elements 15, 16 is formed from a soft metallic material configured to compressibly deform when forming a fluid tight seal at each of the sealing elements 15, 16.

The threaded fastener 9 includes a head 17 configured to engage the second block 12 and a nut 18 configured to engage the third block 13. A turning and tightening of the nut 18 results in the second block 12 being drawn towards the third block 13 as a clamping force is applied axially to the assembly of the blocks 3, 12, 13. An increasing of the clamping force progressively results in a compression of the first sealing elements 15 between the first block 3 and the second block 12 as well as a compression of the second sealing elements 16 between the first block 3 and the third block 13. The compression of the sealing elements 15, 16 may include the soft metallic portion of each of the sealing elements 15, 16 being plastically deformed to a desired extent associated with a desired clamping force being applied to the assembly of the blocks 3, 12, 13.

FIG. 1 illustrates the expansion valve assembly 1 when operating at a relatively low temperature, such as about 25° C., which is significantly lower than an expected maximum operating temperature of the expansion valve assembly 1, which may exceed 150° C. The fastener 9 is shown as applying the desired clamping force to the assembly of the blocks 3, 12, 13 for compressing and deforming the sealing elements 15, 16 to a desired extent for forming a fluid tight seal at each corresponding joint. As shown in FIG. 1, the assembly of the blocks 3, 12, 13 may include a combined length L when subjected to the desired clamping force from the fastener 9 and when operating at the relatively low temperature. As a temperature of the expansion valve assembly 1 is increased during operation thereof, the blocks 3, 12, 13 and the fastener 9 undergo corresponding thermal expansions. The formation of at least the first block 3 from the first material results in the first block 3 experiencing a disproportionate extent of thermal expansion in the axial direction thereof when subjected to the same increase in temperature in comparison to the same length of the fastener 9.

The increased axial expansion of the first block 3 relative to the fastener 9 causes the outer disposed blocks 12, 13 to bear against the interior facing surfaces of the head 17 and the nut 18, respectively. As the first block 3 is heated towards the maximum expected operating temperature thereof, the assembly of the blocks 3, 12, 13 attempts to expand axially to a length L+ΔL, which is representative of a total length of the assembly of the blocks 3, 12, 13 that would be expected if the assembly was not bearing against the opposing surfaces of the head 17 and the nut 18 of the fastener 9. The length ΔL is accordingly representative of the expected unconstrained increase in length of the assembly due to the thermal expansion of the first block 3, which is exaggerated in FIG. 1 to better illustrate the concept being described herein.

Initially, the increase in thermal expansion experienced by the first block 3 may be accommodated and reacted to by a flexing of the assembly of the blocks 3, 12, 13 due to the localized nature of the application of the clamping force between the head 17 and the nut 18. However, as the expansion valve assembly 1 is heated towards the maximum expected operating temperature, the difference in thermal expansion between the blocks 3 and the fastener 9 may become great enough that the increasing clamping force applied by the fastener 9 is reacted to by a further compressing of the sealing elements 15, 16 between the respective blocks 3, 12, 13. That is, the manner in which the assembly of the blocks 3, 12, 13 attempts to increase in axial length by the length ΔL against the bearing of the head 17 and the nut 18 results in a compressive deformation of the soft metallic portion of each of the sealing elements 15, 16. This additional compression and deformation of the sealing elements 15, 16 is shown in FIG. 2, which shows each of the sealing elements 15, 16 being further deformed in the axial direction in comparison to FIG. 1.

This added axial deformation of each of the sealing elements 15, 16 can lead to a circumstance wherein a sealing effect of each of the sealing elements 15, 16 is reduced upon a return of the expansion valve assembly 1 and the first block 3 to the relatively low temperature value associated with FIG. 1, which corresponds to the assembly of the blocks 3, 12, 13 attempting to return to the original length L. Specifically, the reduction in the axial dimension of each of the sealing elements 15, 16 can reduce an axial gap present between each of the adjacent blocks 3, 12, 13, which can result in a reduced total length of the assembly of the blocks 3, 12, 13. This reduced total length can lead to the clamping force applied by the fastener 9 no longer being great enough to maintain the desired sealing force at each of the sealing elements 15, 16, thereby posing a risk of leakage of refrigerant passing therethrough. Additionally, the undesired additional compressive deformation of the sealing elements 15, 16 can also provide a failure mechanism for the sealing elements 15, 16, which can also lead to the potential for leakage from the assembly.

There is accordingly a continuing need for a block fitting assembly configured to safeguard against an over-compression of the sealing elements thereof while maintaining a desired clamping force in response to thermal load cycling.

SUMMARY OF THE INVENTION

Consistent and consonant with the instant disclosure, a block fitting assembly configured to safeguard against an over-compression of the sealing elements thereof while maintaining a desired clamping force in response to thermal load cycling has surprisingly been discovered.

In one embodiment of the present invention, a first block is disclosed for use in a block fitting assembly including a first sealing element, a second block, and a clamping device configured to apply a clamping force compressing the first sealing element between the first block and the second block. The first block includes a first heel structure projecting axially from a surface of the first block facing towards the second block. The first heel structure is configured to be spaced apart from or to contact the second block depending on a temperature of at least one of the first block or the second block when the clamping device is applying the clamping force compressing the first sealing element between the first block and the second block.

In another embodiment of the present invention, a block fitting assembly includes a first block, a second block, and a first sealing element disposed between the first block and the second block. A clamping device applies a clamping force for compressing the first sealing element between the first block and the second block in an axial direction of the block fitting assembly. A first heel structure projects axially from one of the first block or the second block and projects towards the other of the first block or the second block. The first heel structure is configured to be spaced apart from or to contact the other of the first block or the second block depending on a temperature of the first block.

DRAWINGS

The above, as well as other advantages of the present invention, will become readily apparent to those skilled in the art from the following detailed description of a preferred embodiment when considered in the light of the accompanying drawings in which.

Figure 12:
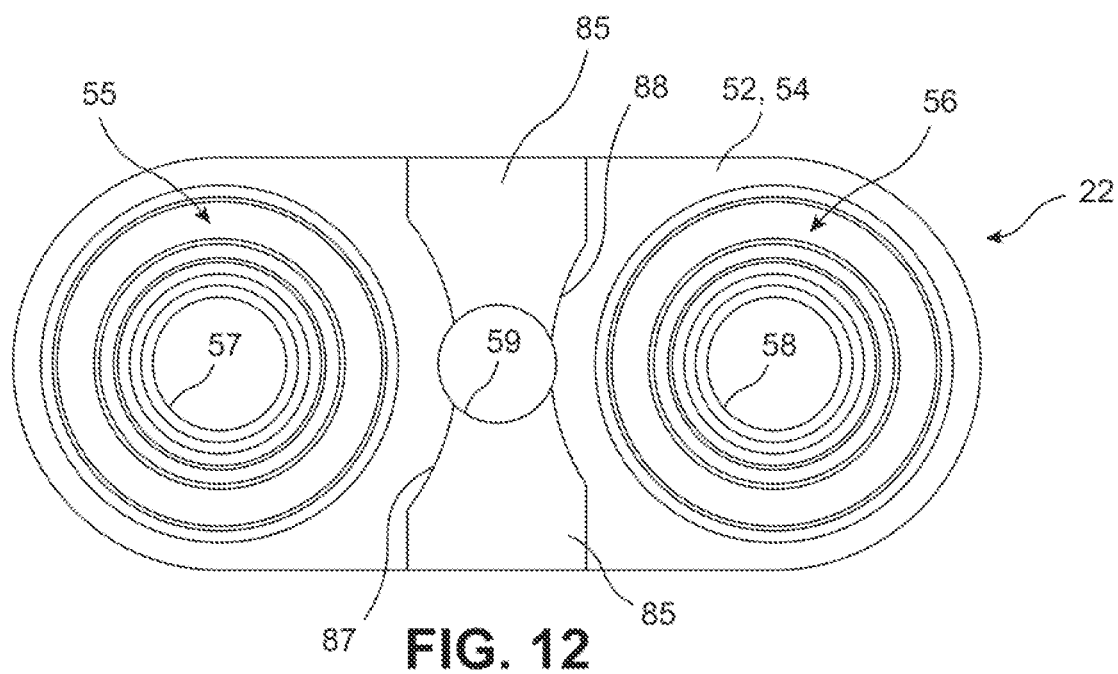
Figure 13:
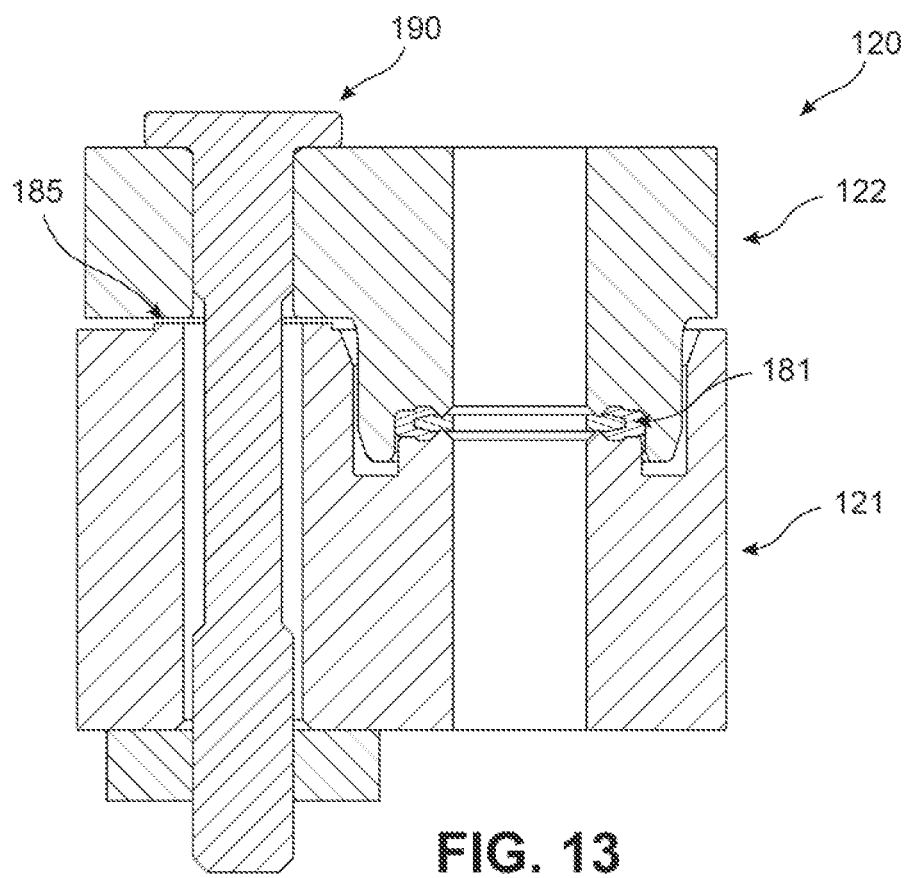

FIG. 12 is a bottom plan view of the second block of the block fitting assembly according to another embodiment of the present invention, wherein the second block includes a heel structure having an arcuate portion biased to one side of a fastener aperture of the second block; and FIG. 13 is a cross-sectional elevational view of a block fitting assembly according to yet another embodiment of the present invention.

DETAILED DESCRIPTION OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

FIGS. 3-6 illustrate an expansion valve assembly 20 having a feature for safeguarding against excessive fastener clamp-load according to an embodiment of the present invention. The disclosed expansion valve assembly 20 is merely one exemplary implementation of the disclosed technology, which generally relates to block fitting assemblies subjected to varying degrees of thermal expansion. As explained with further reference to FIG. 13, the general concepts of the present invention may be adapted for application to a number of different block fitting configurations while remaining within the scope of the present invention, hence the disclosed structure of the expansion valve assembly 20 should be considered non-limiting in implementing the safeguarding feature.

The illustrated expansion valve assembly 20 may be representative of a dual-port electronic expansion valve assembly configured to selectively alter the temperature and/or pressure of two distinct fluid flows passing therethrough. As shown schematically in FIG. 3, the expansion valve assembly 20 may include one or more expansion elements 25 configured to be adjustable in cross-sectional flow area in order to selectively restrict and then expand a flow of a fluid passing therethrough in order to selectively adjust a temperature and/or pressure of the fluid. Each of the expansion elements 25 may be electronically activated to allow for precise control of the cross-sectional flow area therethrough. However, it should be apparent that the disclosed configuration of the expansion valve assembly 20 may be adapted to alternative applications relating to the flow of one or more fluid flows through such an assembly. For example, the general configuration of the expansion valve assembly 20 may be adapted to apply to other components utilized in changing the temperature and/or pressure of a fluid passing therethrough. In such an example, each of the illustrated expansion elements 25 may be representative of a structure utilized in performing such a change in temperature and/or pressure, such as a heat exchanging structure or a flow directing structure, as desired.

The expansion valve assembly 20 includes a first block 21, a second block 22, and a third block 23. The expansion valve assembly 20 may accordingly be alternatively referred to hereinafter as the block fitting assembly 20. The first block 21 may be representative of a housing of an expansion valve having each of the expansion elements 25 while the second and third blocks 22, 23 may be representative of couplings associated with fluid lines 99 communicating one or more fluids to or from the expansion elements 25.

The first block 21 extends axially from a first axial end surface 31 to an opposing second axial end surface 32. The first axial end surface 31 includes a planar portion 33 arranged perpendicular to the axial direction of the first block 21. The first axial end surface 31 further includes a first sealing portion 35 and a second sealing portion 36, each of which are provided as recessed portions of the first axial end surface 31 relative to the surrounding planar portion 33. The second axial end surface 32 similarly includes a planar portion 34 arranged perpendicular to the axial direction of the first block 21, a first sealing portion 45 formed as a recessed portion of the second axial end surface 32 relative to the surrounding planar portion 34, and a second sealing portion 46 formed as a recessed portion of the second axial end surface 32 relative to the surrounding planar portion 34.

A first passageway 27 and a second passageway 28 extend axially through the first block 21 from the first axial end surface 31 to the second axial end surface 32. A first end of the first passageway 27 is surrounded by the first sealing portion 35 of the first axial end surface 31 and the opposing second end of the first passageway 27 is surrounded by the first sealing portion 45 of the second axial end surface 32. As mentioned above, the first passageway 27 and/or the second passageway 28 may include one of the expansion elements 25 disposed therein, as desired. A fastener aperture 29 also extends through the first block 21 from the first axial end surface 31 to the second axial end surface 32 thereof at a position intermediate the first passageway 27 and the second passageway 28.

Figure 1:
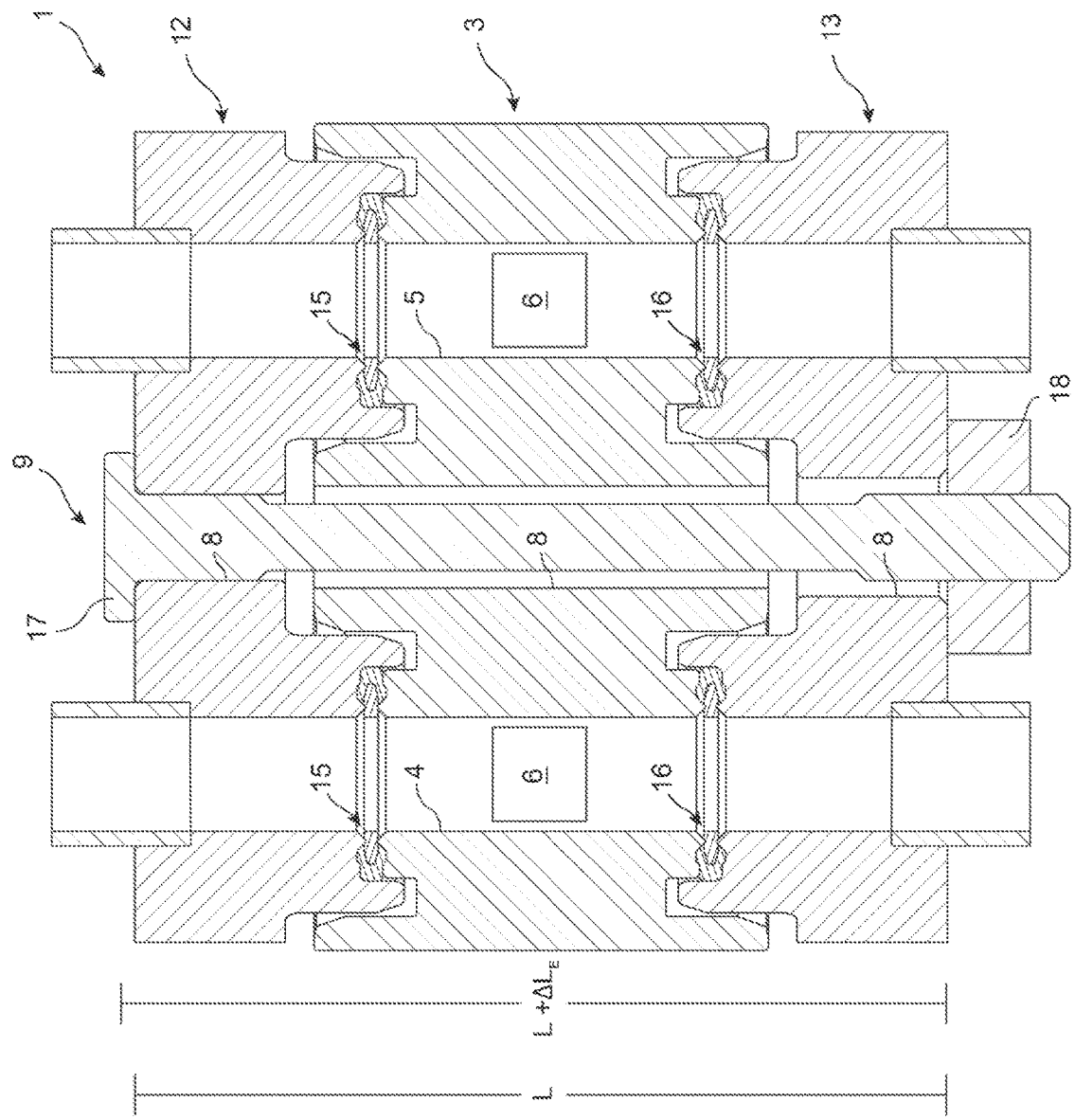
FIG. 1 is a cross-sectional elevational view of an exemplary block fitting assembly for use with an expansion valve assembly, wherein the block fitting assembly is illustrated prior to a heating thereof towards a maximum expected operating temperature.
Figure 2:
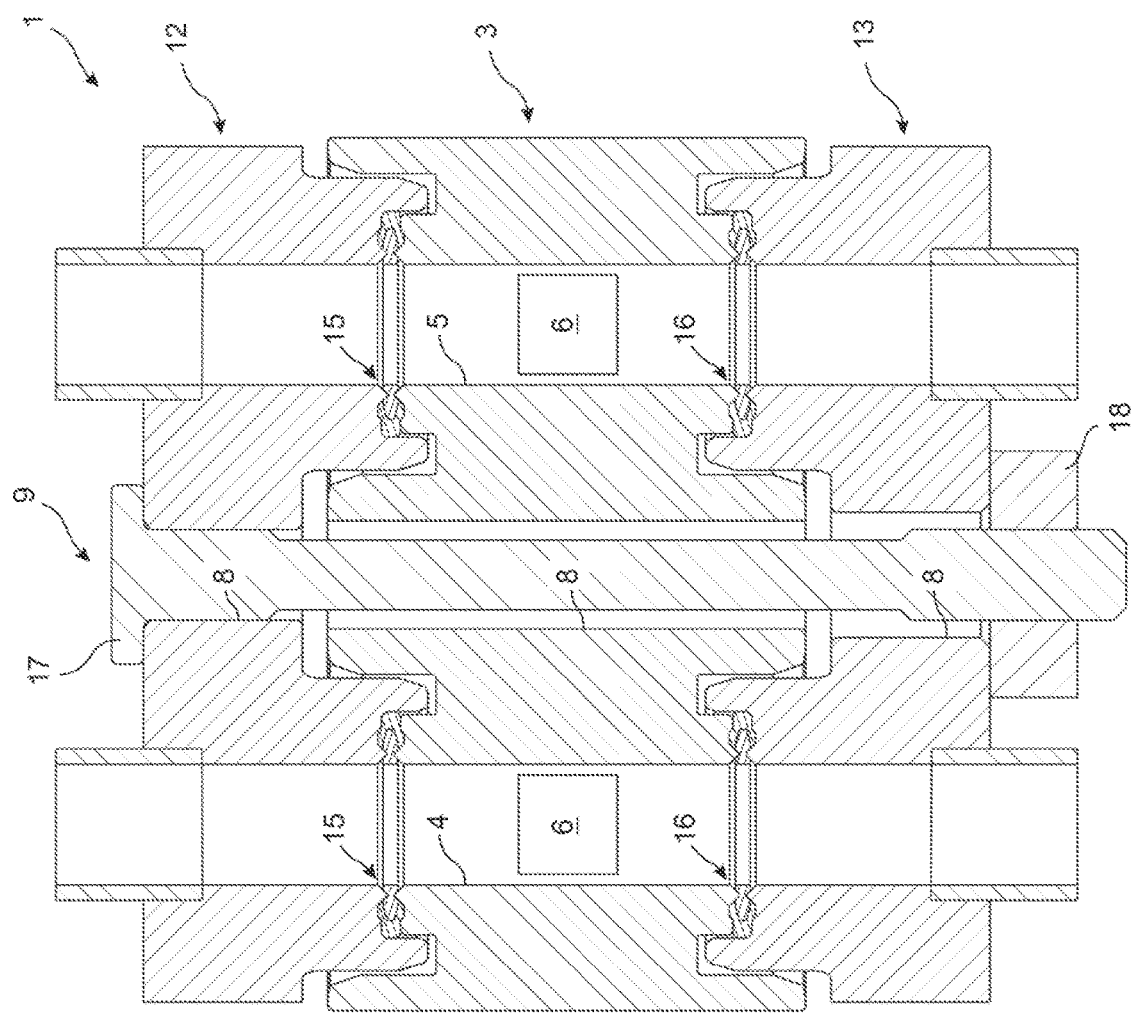
FIG. 2 is a cross-sectional elevational view of the exemplary block fitting assembly of FIG. 1 after having been heated to the maximum expected operating temperature.
Figure 3:
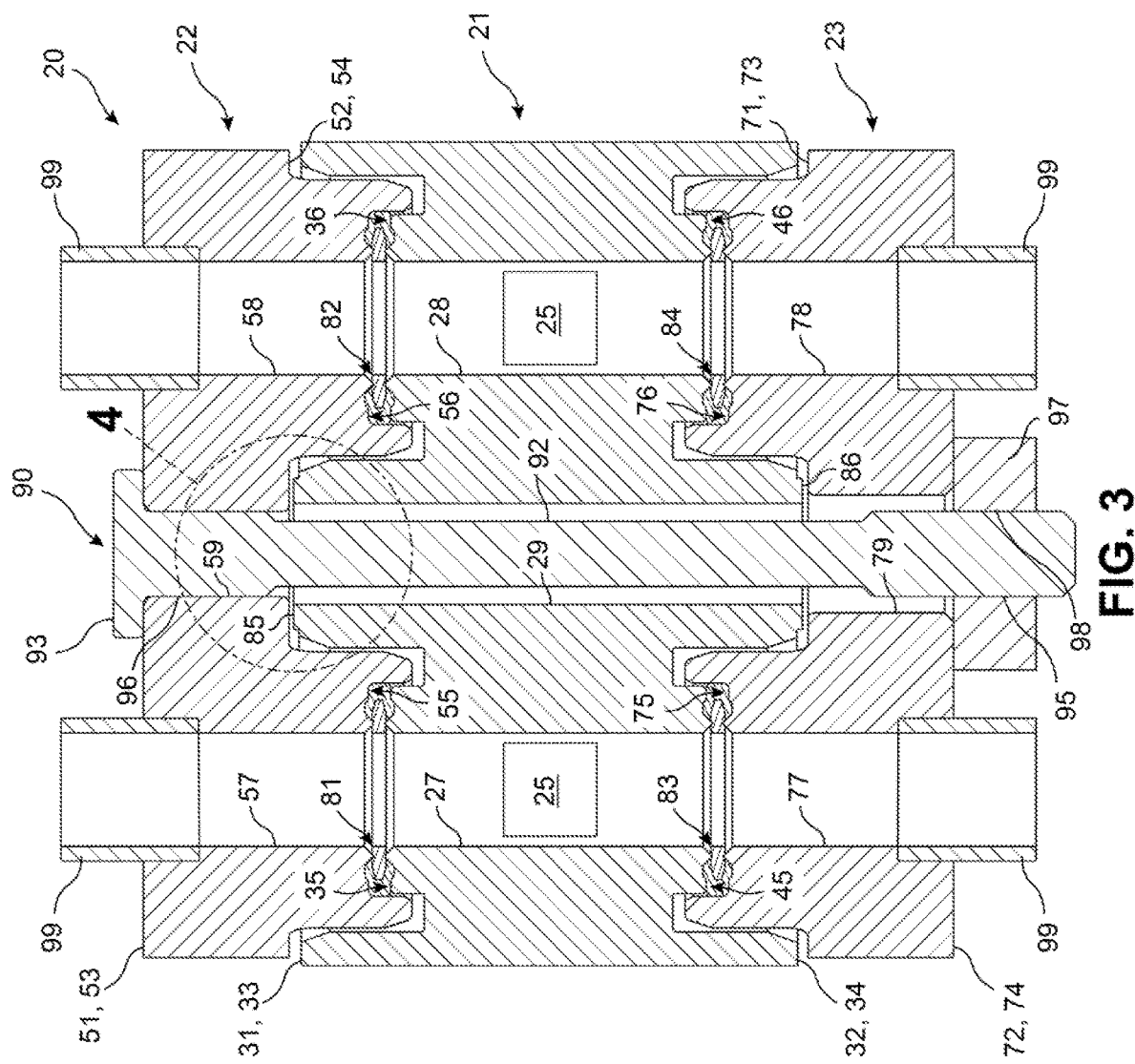
FIG. 3 is a cross-sectional elevational view of a block fitting assembly according to an embodiment of the present invention, wherein the block fitting assembly is implemented into an exemplary dual port electronic expansion valve.

The first passageway 27 and the second passageway 28 are illustrated in FIG. 3 as extending rectilinearly through the first block 21 between the respective first and second ends thereof, but the passageways 27, 28 may instead include any number of offsets or changes in direction as is necessarily to perform the desired function with respect to the fluid passing therethrough. For example, the first and second ends of one or both of the passageways 27, 28 may be offset laterally from one another with respect to a direction perpendicular to the axial direction of the first block 21. The passageways 27, 28 are also shown as including the same inner diameter, but the inner diameters of the passageways 27, 28 may vary from one another while remaining within the scope of the present invention.

The second block 22 extends axially from a first axial end surface 51 to an opposing second axial end surface 52. The first axial end surface 51 includes a planar portion 53 and the second axial end surface 52 includes a planar portion 54, each of which is arranged perpendicular to the axial direction of the second block 22. The second axial end surface 52 further includes a first sealing portion 55 and a second sealing portion 56, each of which are provided as projecting portions of the second axial end surface 52 relative to the surrounding planar portion 54. The first sealing portion 55 of the second block 22 is configured for axial reception within the first sealing portion 35 of the first axial end surface 31 of the first block 21 and the second sealing portion 56 of the second block 22 is configured for axial reception within the second sealing portion 36 of the first axial end surface 31 of the first block 21.

Although the sealing portions 35, 36 are described as recessed portions and the sealing portions 55, 56 are described as projecting portions, it should be apparent to one skilled in the art that the configuration of the sealing portions 35, 36, 55, 56 may be reversed or otherwise modified while remaining within the scope of the present invention. In other words, the selection of which of the sealing portions 35, 36, 55, 56 forms a male component or a female component of the corresponding joint does not affect the operation of the present invention as described herein.

The second block 22 further includes a first passageway 57 and a second passageway 58 extending therethrough from the first axial end surface 51 to the second axial end surface 52. A first end of the first passageway 57 may be configured for coupling to one of the external fluid lines 99 while a second end of the first passageway 57 is surrounded by the first sealing portion 55. Similarly, a first end of the second passageway 58 may be configured for coupling to another one of the external fluid lines 99 while a second end of the second passageway 58 is surrounded by the second sealing portion 56. A fastener aperture 59 also extends through the second block 22 from the first axial end surface 51 to the second axial end surface 52 thereof at a position intermediate the first passageway 57 and the second passageway 58.

The third block 23 extends axially from a first axial end surface 71 to an opposing second axial end surface 72. The first axial end surface 71 includes a planar portion 73 and the second axial end surface 72 includes a planar portion 74, each of which is arranged perpendicular to the axial direction of the third block 23. The first axial end surface 71 further includes a first sealing portion 75 and a second sealing portion 76, each of which are provided as projecting portions of the first axial end surface 71 relative to the surrounding planar portion 73. The first sealing portion 75 of the third block 23 is configured for axial reception within the first sealing portion 45 of the second axial end surface 32 of the first block 21 and the second sealing portion 76 of the third block 23 is configured for axial reception within the second sealing portion 46 of the second axial end surface 32 of the first block 21.

Although the sealing portions 45, 46 are described as recessed portions and the sealing portions 75, 76 are described as projecting portions, it should be apparent to one skilled in the art that the configuration of the sealing portions 45, 46, 75, 76 may be reversed or otherwise modified while remaining within the scope of the present invention. In other words, the selection of which of the sealing portions 45, 46, 75, 76 forms a male component or a female component of the corresponding joint does not affect the operation of the present invention as described herein.

The third block 23 further includes a first passageway 77 and a second passageway 78 extending therethrough from the first axial end surface 71 to the second axial end surface 72. A first end of the first passageway 77 is surrounded by the first sealing portion 75 while a second end of the first passageway 77 may be configured for coupling to one of the external fluid lines 99. Similarly, a first end of the second passageway 78 is surrounded by the second sealing portion 76 while a second end of the second passageway 78 may be configured for coupling to another one of the external fluid lines 99. A fastener aperture 79 also extends through the second block 23 from the first axial end surface 71 to the second axial end surface 72 thereof at a position intermediate the first passageway 77 and the second passageway 78. The fastener aperture 29 of the first block 21, the fastener aperture 59 of the second block 22, and the fastener aperture 79 of the third block 23 may all be axially aligned and concentrically arranged relative to each other.

The block fitting assembly 20 further includes a plurality of sealing elements 81, 82, 83, 84. The sealing elements 81, 82, 83, 84 may include a first sealing element 81 configured for compression between the first sealing portion 35 of the first axial end surface 31 of the first block 21 and the first sealing portion 55 of the second block 22, a second sealing element 82 configured for compression between the second sealing portion 36 of the first axial end surface 31 of the first block 21 and the second sealing portion 56 of the second block 22, a third sealing element 83 configured for compression between the first sealing portion 45 of the second axial end surface 32 of the first block 21 and the first sealing portion 75 of the third block 23, and a fourth sealing element 84 configured for compression between the second sealing portion 46 of the second axial end surface 32 of the first block 21 and the second sealing portion 76 of the third block 23. At least a portion of each of the sealing elements 81, 82, 83, 84 may be formed from a relatively soft and compressibly deformable metallic material, such as aluminum, copper, or alloys thereof, as non-limiting examples. For example, each of the sealing elements 81, 82, 83, 84 may include an annular metallic portion and an annular elastomer portion attached to the metallic portion, wherein the metallic portion forms the compressibly deformable metallic material that is configured to be plastically deformed by a compression of the corresponding sealing element 81, 82, 83, 84. In other embodiments, an entirety of one or more of the sealing elements 81, 82, 83, 84 may be formed from the compressibly deformable material, as desired.

The block fitting assembly 20 further includes a fastener 90 acting as a clamping device for applying an axial clamping force to the assembly of the blocks 21, 22, 23 and the sealing elements 81, 82, 83, 84. This axial clamping force is configured to compress each of the sealing elements 81, 82, 83, 84 to a desired extent, which may include a plastic deformation of at least a portion of each of the sealing elements 81, 82, 83, 84 to achieve a desired sealing configuration.

The fastener 90 includes an axially extending shaft 92 having a head 93 formed at a first end thereof and a first threaded portion 95 formed on an outer surface of the shaft 92 adjacent a second end thereof. The head 93 is flanged outwardly and is configured to contact the first axial end surface 51 of the second block 22. The first threaded portion 95 is configured to mate with a corresponding threaded portion 98 formed on an inner surface of a nut 97. The nut 97 is configured to be axially adjustable via a turning thereof about the shaft 92 in order to cause the nut 97 to advance to a position contacting the second axial end surface 72 of the third block 23. The nut 97 may be turned until a desired clamping force is applied to the assembly of the blocks 21, 22, 23 between the head 93 and the nut 97 for forming a desired seal at each of the sealing elements 81, 82, 83, 84. In some embodiments, the fastener 90 further includes a second threaded portion 96 adjacent the head 93 which is configured to mate with a corresponding threaded portion of the fastener aperture 59 of the second block 22, as desired. An orientation of the fastener 90 may be reversed from that shown and described while remaining within the scope of the present invention. Specifically, the positioning of the head 93 and the nut 97 may be reversed such that the head 93 engages the third block 23 and the nut 97 selectively engages the second block 22, as desired.

The disclosed fastener 90 may be replaced with any form of clamping device delivering the desired clamping force to the opposing ends of the block fitting assembly 20 for compressing the sealing elements 81, 82, 83, 84 between the blocks 21, 22, 23 while remaining within the scope of the present invention. Such a clamping device may be comprised of any two opposing surfaces configured to apply a clamping force to the outer disposed blocks 22, 23, and may preferably include the clamping force being applied at the position of the disclosed fastener 90 for distributing the clamping force to each of the sealing elements 81, 82, 83, 84 formed to opposing sides of the application of the clamping force. The clamping force may alternatively be applied to the assembly at multiple locations with a sum of the distributed clamping forces being applied at the position of the fastener 90.

The first block 21 is formed from a first material and the fastener 90 is formed from a second material different from the first material. In some embodiments, the second block 22 and the third block 23 may also be formed from the first material. In other embodiments, the second block 22 and the third block 23 may be formed from the second material, or a third material different from the first material or the second material. The first material includes a greater coefficient of thermal expansion than the second material, thereby indicating that the first material thermally expands more than the second material when subjected to the same increase in temperature. In the present example, this indicates that the first block 21 is expected to lengthen a greater extent in the axial direction than would a corresponding length of the shaft 92 of the fastener 90 when exposed to the same increase in temperature. The first material may be aluminum and the second material may be steel, as one non-limiting combination. However, any combination of materials having the disclosed relationship may be utilized while remaining within the scope of the present invention.

The block fitting assembly 20 is shown in FIG. 3 as having a substantially symmetric configuration relative to the fastener 90 wherein the passages 27, 57, 77 and sealing elements 81, 83 formed to one side of the fastener 90 are identical to the passages 28, 58, 78 and sealing elements 82, 84 formed to the other side of the fastener 90. However, the illustrated configuration is non-limiting, as the dimensions and configurations of any of the passages 27, 28, 57, 58, 77, 78 or sealing elements 81, 82, 83, 84 may be varied from one another while remaining within the scope of the present invention. For example, in some embodiments the passageways 27, 57, 77 may include a different diameter than the passageways 28, 58, 78. As other examples, the sealing elements 81, 82 may include different axial thicknesses than the sealing elements 83, 84, or may be formed from different materials or combination of materials than the sealing elements 83, 84. Such variations may be introduced to accommodate the differences that may be present between the two distinct fluid flows passing through the block fitting assembly 20. For example, the fluid flows may vary in fluid type, pressure, temperature, or chemical reactivity, thereby necessitating these differences in structure in order to ensure desired operation of components such as the expansion elements 25.

The block fitting assembly 20 further includes a first heel structure 85 projecting axially from the first axial end surface 31 of the first block 21 and a second heel structure 86 projecting axially from the second axial end surface 32 of the first block 21. More specifically, the first heel structure 85 may project axially relative to the adjacent planar portion 33 of the first axial end surface 31, while the second heel structure 86 may project axially relative to the adjacent planar portion 34 of the second axial end surface 32. The first heel structure 85 projects axially in a direction towards the second block 22 while the second heel structure 86 projects axially in a direction towards the third block 23. The first heel structure 85 is configured to be axially spaced apart from or to contact the second axial end surface 52 of the second block 22 depending on a temperature of the first block 21. Similarly, the second heel structure 86 is configured to be axially spaced apart from or to contact the first axial end surface 71 of the third block 23 depending on the temperature of the first block 21. Specifically, the engagement of either of the heel structures 85, 86 with either of the respective blocks 22, 23 is dependent upon the degree of thermal expansion occurring within the first block 21 with respect to the axial direction thereof, wherein an increase in the temperature of the first block 21 corresponds to the first block 21 lengthening axially such that the first heel structure 85 approaches the second block 22 while the second heel structure 86 approaches the third block 23. The first heel structure 85 is configured to be axially spaced apart from the second block 22 when the first block 21 is at a temperature below a threshold temperature, and the first heel structure 85 is configured to contact the second block 22 when the first block 21 is at a temperature at or above the threshold temperature. The approaching of the first heel structure 85 towards the second block 22 is shown by comparison of FIGS. 4 and 5. Similarly, the second heel structure 86 is configured to be axially spaced apart from the third block 23 when the first block 21 is at a temperature below the threshold temperature, and the second heel structure 86 is configured to contact the third block 23 when the first block 21 is at a temperature at or above the threshold temperature. The second heel structure 86 approaches the third block 23 in the opposing axial direction in identical fashion to that shown and described with reference to the first heel structure 85, hence further illustration thereof is omitted herefrom.

The threshold temperature at which the heel structures 85, 86 are configured to make the initial contact with the facing blocks 22, 23 may be selected to correspond to a temperature at which the thermal expansion of the first block 21 relative to the fastener 90 is expected to compress one or more of the sealing elements 81, 82, 83, 84 to an undesirable extent in accordance with the effect described in the background of the present invention wherein the head 93 and the nut 97 of the fastener 90 constrain the axial expansion of the assembly of the blocks 21, 22, 23. Prior to the first block 21 reaching the threshold temperature, a flexing of the structure of the blocks 21, 22, 23 may initially compensate for the increasing clamping force without compressing one or more of the sealing elements 81, 82, 83, 84 in the undesirable fashion. After the first block 21 surpasses the threshold temperature, the heel structures 85, 86 may continue to react accordingly to the increasing clamping force.

The block fitting assembly 20 may be tuned by selecting an initial axial gap present between each of the heel structures 85, 86 and each of the facing blocks 22, 23 when the block fitting assembly 20 is subjected to a desired clamping force and when at a known temperature. The change in temperature of the first block 21 from this known temperature that is expected to occur during operation thereof can then be used to determine the thermal expansion of the first block 21 that will cause the contact between each of the heel structures 85, 86 and each of the facing blocks 22, 23.

The contact of either of the heel structures 85, 86 with the facing surface of the corresponding block 22, 23 results in an instantaneous redistribution of the clamping force from being applied exclusively to the sealing elements 81, 82, 83, 84 to being at least partially reacted to where the blocks 21, 22, 23 contact each other via the corresponding heel structures 85, 86. Specifically, at least a portion of the clamping force being transferred from the first block 21 to the second block 22 where the first heel structure 85 contacts the second block 22 corresponds to a reduction in a portion of the clamping force transferred from the first block 21 to the second block 22 through the sealing elements 81, 82. Similarly, at least a portion of the clamping force being transferred from the first block 21 to the third block 23 where the second heel structure 86 contacts the third block 23 corresponds to a reduction in a portion of the clamping force transferred from the first block 21 to the third block 23 through the sealing elements 83, 84.

A position of each of the heel structures 85, 86 with respect to a plane arranged perpendicular to the axial direction of the block fitting assembly 20 also affects how the clamping force is redistributed at each of the sealing elements 81, 82, 83, 84. This occurs because the redistribution of the axial forces occurring when the heel structures 85, 86 make contact with the facing blocks 22, 23 is dependent on a balancing of the bending moments formed within the block fitting assembly 20 as a result of these axial forces, wherein a distance and position of each axial force from a center of the application of the clamping force will have a different effect on this redistribution.

Figure 6:
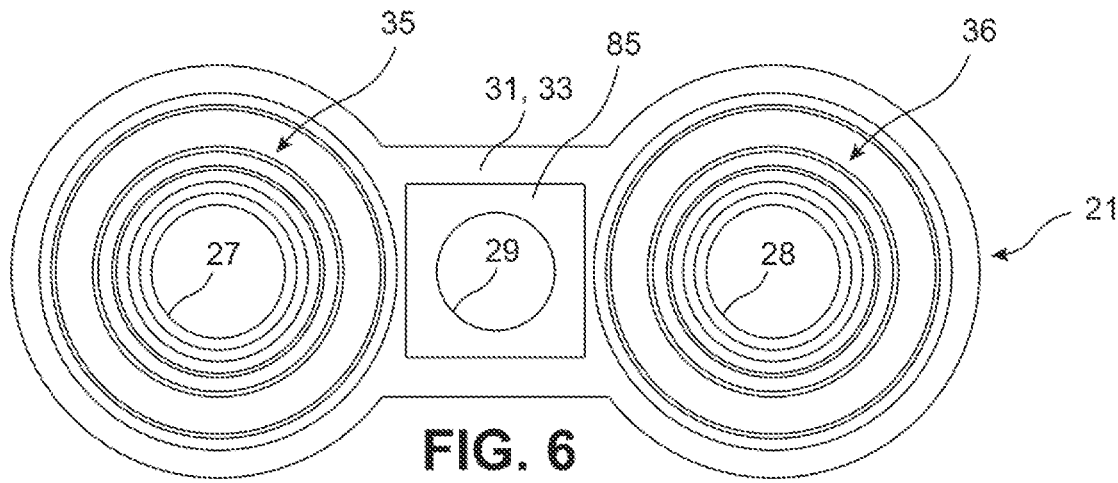
FIG. 6 is a top plan view of a first block of the block fitting assembly of FIG. 3 shown in isolation, wherein the first block includes a heel structure surrounding a fastener aperture of the first block.

As best shown in FIG. 6, which shows the first block 21 in isolation, the first heel structure 85 may be disposed at or adjacent a perimeter of the fastener aperture 29 of the first block 21. More specifically, the first heel structure 85 may extend around a perimeter of the fastener aperture 29 such that the first heel structure 85 is formed at least partially to each of two different sides of the shaft 92 of the fastener 90. The first heel structure 85 may be axially aligned with one or both of the engaging surface of the head 93 and the engaging surface of the nut 97. The first heel structure 85 may be symmetrically arranged relative to the center of the shaft 92 to cause the reaction force of the first heel structure 85 to the second block 22 when making contacting therewith to also be applied along the center of the shaft 92, which corresponds to the axis of the sum of the clamping force applied by the fastener 90. Such a configuration leads to the redistribution of the clamping force being proportional to the distance each sealing element 81, 82, 83, 84 is spaced from the application of the clamping force.

Figure 7:
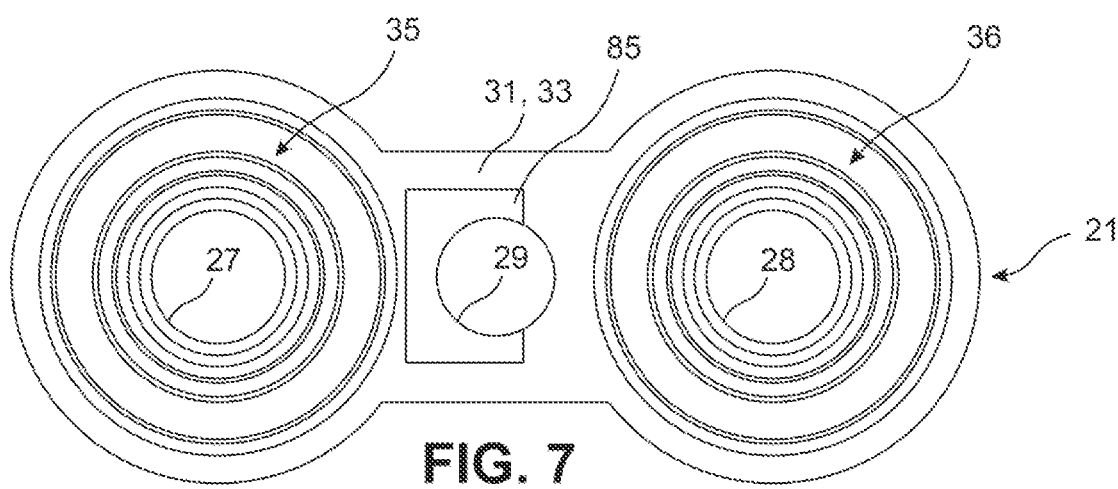
FIG. 7 is a top plan view of a first block of the block fitting assembly according to another embodiment of the invention, wherein the first block includes a heel structure biased to one side of a fastener aperture of the first block.
Figure 8:
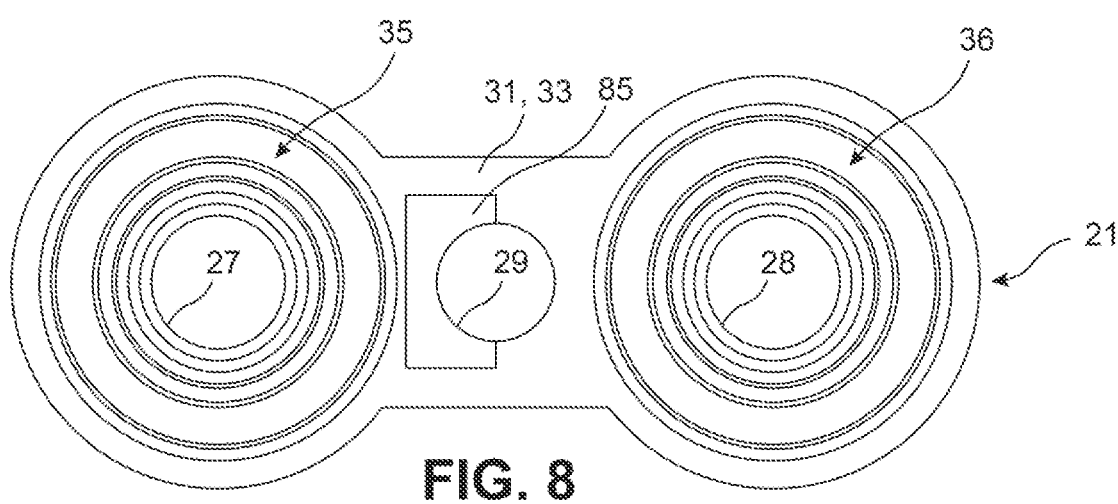
FIG. 8 is a top plan view of a first block of the block fitting assembly according to yet another embodiment of the invention, wherein the first block includes a heel structure disposed entirely to one side of a fastener aperture of the first block.

This effect can be utilized to cause a desired redistribution of the clamping force in accordance with the circumstances present at each of the sealing elements 81, 82, 83, 84. As mentioned above, there may exist variations in form and structure at each of the sealing elements 81, 82, 83, 84 or within the structure of each of the blocks 21, 22, 23 to facilitate the need to apply different compressive forces at each of the sealing elements 81, 82, 83, 84 for achieving each desired seal when experiencing a known clamping force. As such, it may be necessary to bias the redistribution of the clamping force between the different sealing elements 81, 82, 83, 84 by varying a size, shape, and area of the contacting surface of each of the heel structures 85, 86 to have the intended effect. For example, in contrast to FIG. 6, FIG. 7 illustrates a center of the area of the contacting surface of the first heel structure 85 as being positioned to one side of the fastener aperture 29 towards the passageway 27, whereas FIG. 8 illustrates an entirety of the area of the contacting surface of the first heel structure 85 disposed to the side of the fastener aperture 29 towards the passageway 27. Although not pictured, the same biasing of the second heel structure 86 may also be utilized with respect to the contact with the third block 23.

Figure 4:
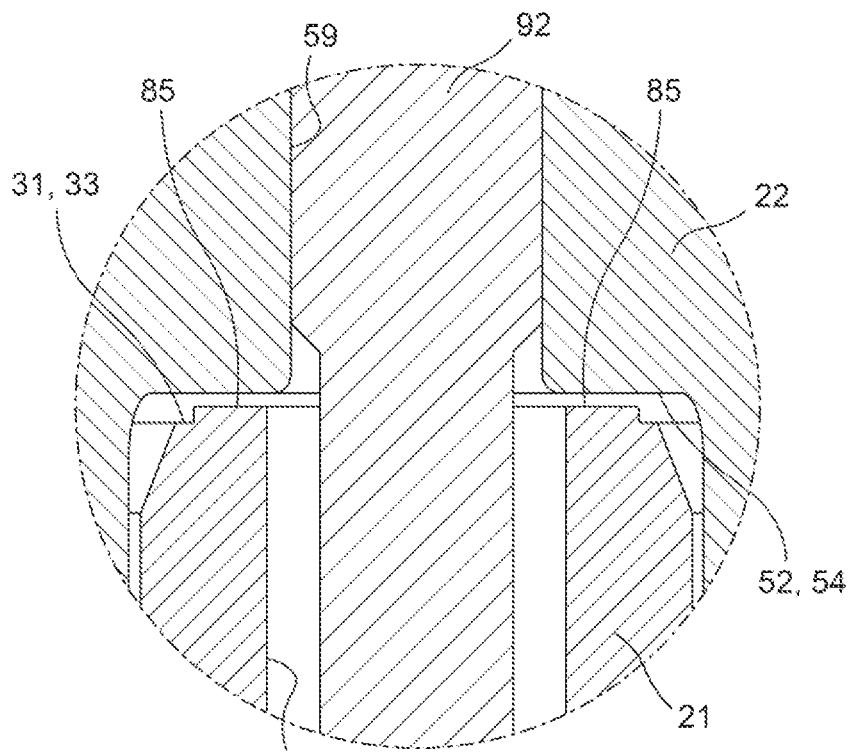
FIG. 4 is an enlarged fragmentary cross-sectional view of the portion of FIG. 3 bounded by circle 4 and illustrates a heel structure projecting axially from a first block of the block fitting assembly when the first block is at a temperature below a threshold temperature value.
Figure 5:
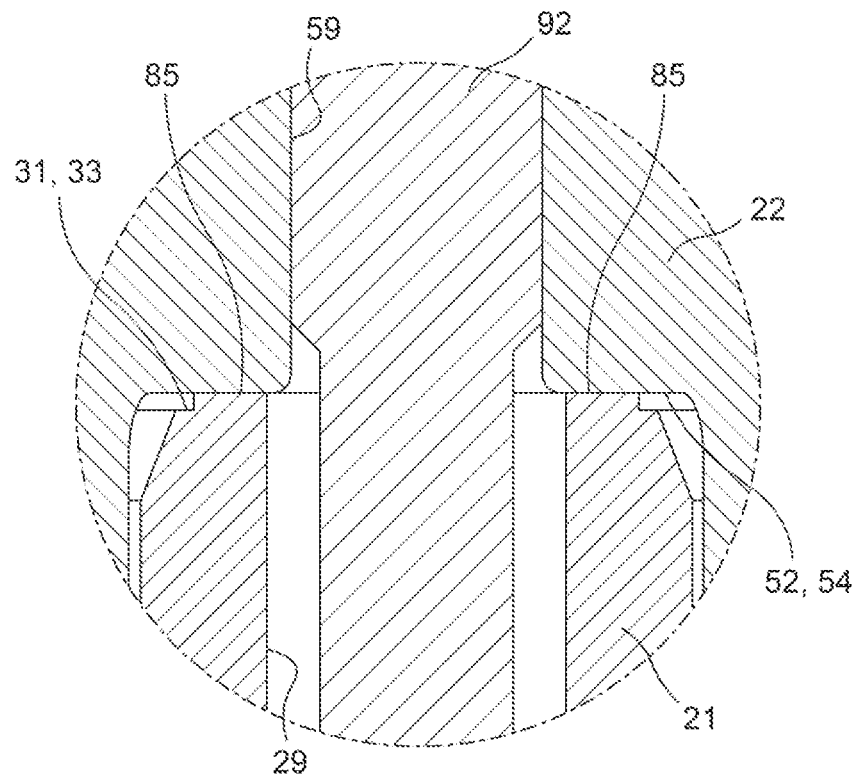
FIG. 5 is an enlarged fragmentary cross-sectional view showing the heel structure of FIG. 4 when the first block at a temperature above the threshold temperature value.
Figure 9:
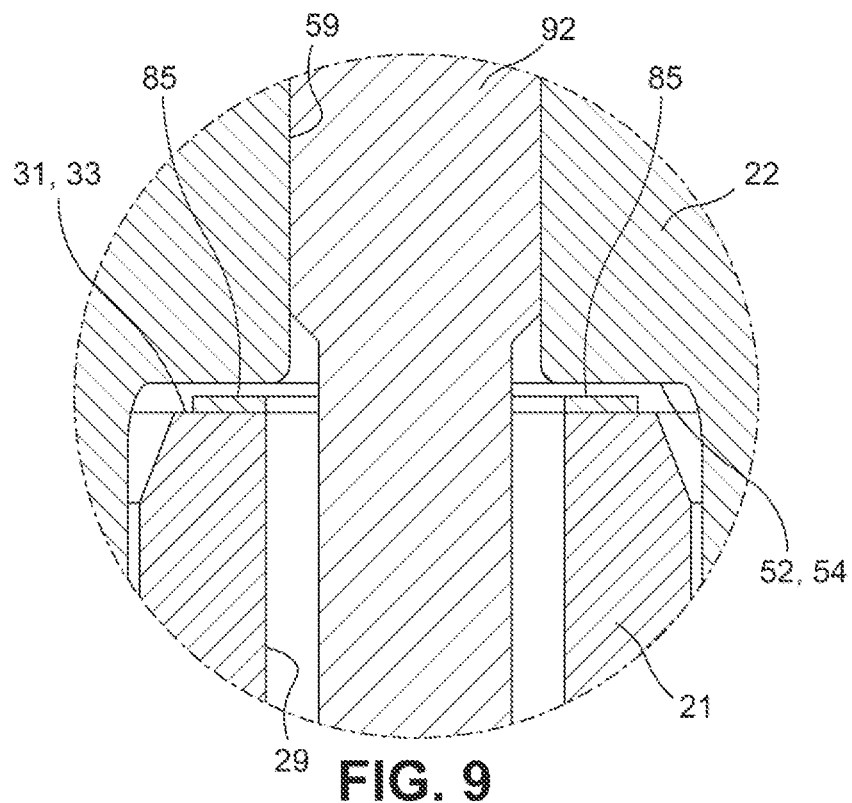
FIG. 9 is an enlarged fragmentary cross-sectional view showing a heel structure according to another embodiment of the present invention, wherein the heel structure is independently formed and coupled to the first block.

The first heel structure 85 and the second heel structure 86 are each shown in FIGS. 3-5 as being projections that are monolithically formed with the remainder of the first block 21. Such monolithic formation of the heel structures 85, 86 with the first block 21 may be accomplished during a common manufacturing process, such as a molding, casting, or machining process, as desired. However, as shown with reference to the first heel structure 85 in FIG. 9, one or both of the first heel structure 85 and the second heel structure 86 may alternatively be provided as independently formed structures that are subsequently coupled to the first block 21 or otherwise removably received within one of the spaces present between a corresponding pair of the blocks 21, 22, 23. Each of the heel structures 85, 86 may accordingly resemble a shim received between the corresponding pair of the blocks 21, 22, 23. If removably received within such a space, each of the heel structures 85, 86 may be one of a plurality of heel structures interchangeably inserted into such spaces for tuning the corresponding block fitting assembly 20 to achieve a desired threshold temperature at which the clamping force is redistributed to the heel structures 85, 86. Such interchangeability may include the different heel structures 85, 86 having different shapes for contacting different areas of the facing pairs of blocks 21, 22, 23, or may include the different heel structures 85, 86 having different axial thicknesses for establishing contact at different threshold temperatures.

Figure 10:
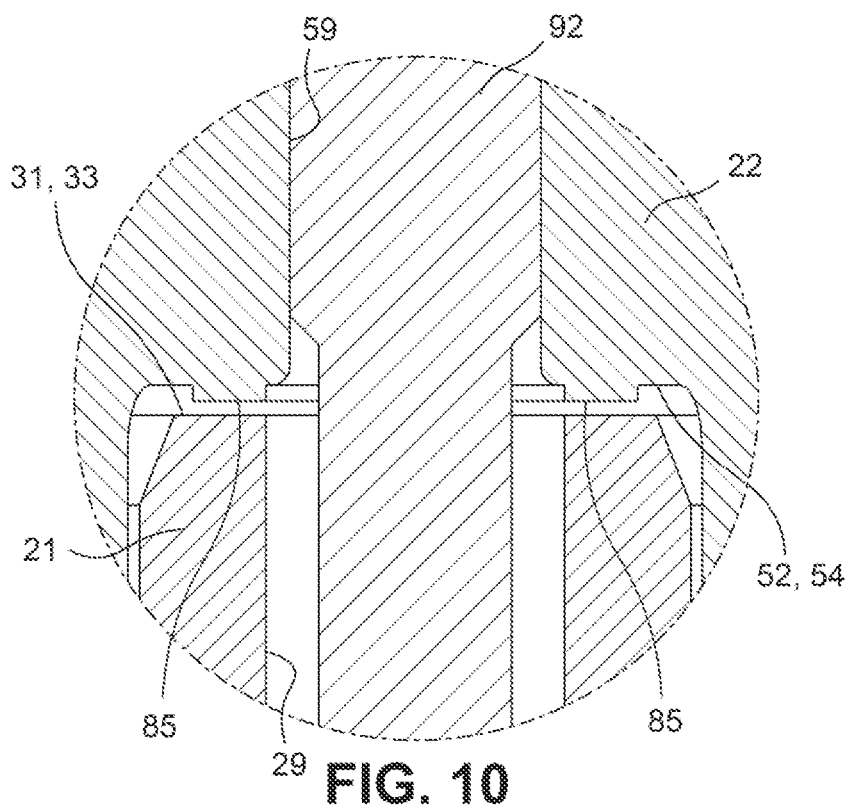
FIG. 10 is an enlarged fragmentary cross-sectional view showing a heel structure according to yet another embodiment of the present invention, wherein the heel structure projects from a second block of the block fitting assembly.

Referring now to FIG. 10, the first heel structure 85 may alternatively be provided as a projection extending axially from the second block 22 in a direction towards the first block 21. Although not pictured, the second heel structure 86 may also be alternatively provided as a projection extending axially from the third block 23 in a direction towards the first block 21, wherein the second heel structure 86 may be substantially symmetrically arranged relative to the depiction of the first heel structure 85 in FIG. 10. The thermal expansion of the first block 21, which is dependent on the temperature thereof, still leads to the selective contact formed between the corresponding heel structure 85, 86 and the first block 21, and the resulting effect is the same as disclosed above with reference to the embodiment of FIGS. 3-5. The extent each of the heel structures 85, 86 projects axially from the corresponding axial end surface 52, 71 and the initial axial gap present between the blocks 21, 22, 23 at the position of each of the heel structures 85, 86 may once again be selected to tune the block fitting assembly 20 to achieve the redistribution of the clamping force at the desired threshold temperature. Any of the different shapes or configurations of the heel structures 85, 86 as shown and described with reference to the first block 21 throughout FIGS. 6-8 may also be applied to the heel structures 85, 86 when alternatively projecting from the respective second and third blocks 22, 23, including biasing the heel structures 85, 86 relative to one or both of the corresponding fastener apertures 59, 79.

Figure 11:
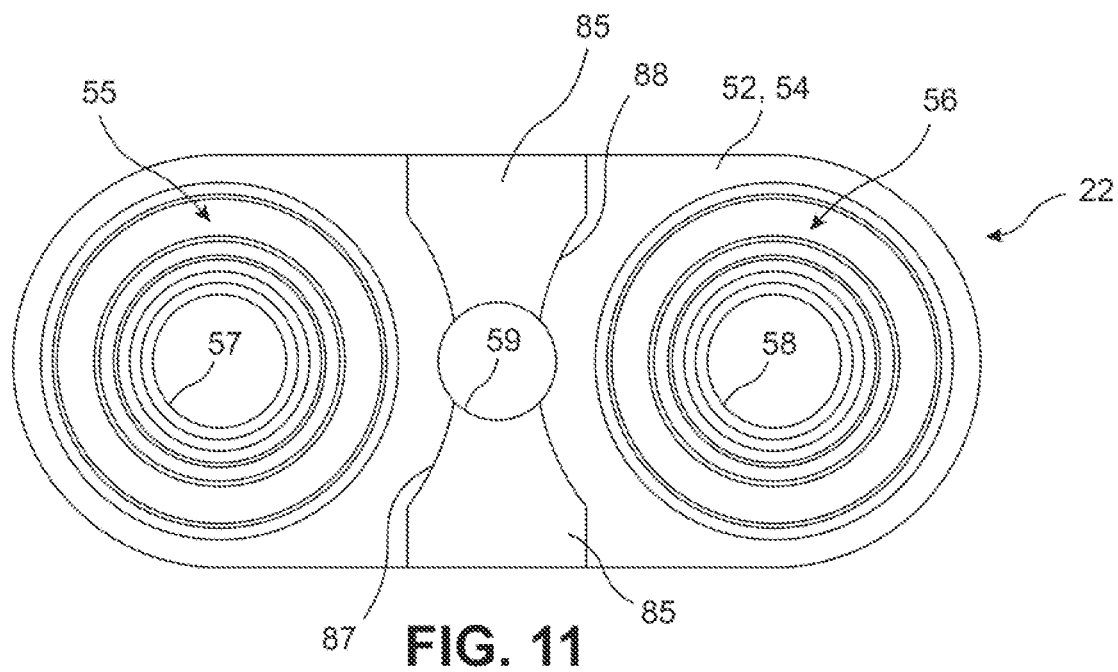
FIG. 11 is a bottom plan view of a second block of the block fitting assembly of FIG. 3 shown in isolation, wherein the second block includes a heel structure having a portion of a perimeter thereof arranged along an arc concentric with a passageway formed through the second block.

FIGS. 11 and 12 illustrate two additional possible configurations of either of the heel structures 85, 86 with the representative first heel structure 85 shown as projecting axially from the planar portion 54 of the second axial end surface 52 of the second block 22. However, the illustrated configuration may also be applicable to the structure of either of the heel structures 85, 86 when projecting from opposing axial ends of the first block 21, or may alternatively be applicable to the second heel structure 86 projecting from the third block 23, as desired.

The first heel structure 85 is shown in FIG. 11 as having a perimeter shape that includes a first portion 87 and a second portion 88. The first portion 87 has a shape of an arc of a circle arranged concentric with the circular shape of the passageway 57 and the second portion 88 has a shape of an arc of a circle arranged concentric with the circular shape of the passageway 58. The first portion 87 also has the shape of an arc of a circle arranged concentric with the circular shape of the first sealing element 81 and the second portion 88 similarly has the shape of an arc of a circle arranged concentric with the circular shape of the second sealing element 82. The first portion 87 accordingly has a radius of curvature measured from a center of each of the passageway 57 and the first sealing element 81 while the second portion 88 has a radius of curvature measured from a center of each of the passageway 58 and the second sealing element 82. The described configuration of the portions 87, 88 may be utilized to better distribute the clamping force to a perimeter of each of the sealing elements 81, 82 upon the first heel structure 85 reacting to a portion of the clamping force to ensure a desired seal around the perimeter of each of the sealing elements 81, 82.

FIG. 12 illustrates the same general configuration as FIG. 11, except the radius of curvature of the second portion 88 has been reduced to result in a majority of the contact area of the first heel structure 85 being biased towards the passageway 58 as opposed to being centered relative to the fastener aperture 59. FIG. 12 accordingly demonstrates the concept that either of the portions 87, 88 having a constant radius of curvature measured from a center of a corresponding one of the passageways 57, 58 may have the radius of curvature thereof altered to allow for the above described biasing of the reaction to the clamping force with respect to one of the opposing sealing elements 81, 82.

The general concepts of the present invention may be applied to substantially any block fitting assembly having at least the elements of the block fitting assembly 120 shown in FIG. 13. The block fitting assembly 120 includes a first block 121, a second block 122, and a fastener 190 applying a clamping force to a sealing element 181. The first block 121 is formed from the first material and the fastener 190 is formed from the second material having the lower coefficient of thermal expansion than the first material. A heel structure 185 is shown as projecting from the first block 121 in a direction towards the second block 122, but the heel structure 185 may alternatively extend from the second block 122 towards the first block 121 in similar fashion the embodiment disclosed in FIG. 10. The heel structure 185 operates in exactly the same fashion as described with reference to the preceding embodiments, wherein an increasing temperature of the first block 121 leads to an axial expansion of the first block 121 until the heel structure 185 contacts the second block 122 for redistributing the clamping force of the fastener 190 when the first block 121 reaches a threshold temperature value.

The general concepts of the present invention may accordingly be applied for redistributing the clamping force of a block fitting assembly having any number of sealing elements arranged in series in the axial direction of the block fitting assembly or any number of the sealing elements arranged at radial positions relative to the application of the clamping force. One of the heel structures may be implemented into the structure of the block fitting assembly at any position therein wherein one of the sealing elements is at risk of undesired axial compression. Additionally, the clamping force does not need to be applied to one of the blocks having the heel structure or making the contact with the heel structure, as the clamping force can be carried through multiple intermediate components with the heel structure achieving the same effect.

While certain representative embodiments and details have been shown for purposes of illustrating the invention, it will be apparent to those skilled in the art that various changes may be made without departing from the scope of the disclosure, which is further described in the following appended claims.

What is claimed is:

1. A block fitting assembly comprising:
   a first block,
   a first sealing element,
   a second block,
   a clamping device applying a clamping force and compressing the first sealing element between the first block and the second block; and
   a first heel structure projecting axially from a surface of the first block facing towards the second block, wherein the first heel structure is spaced apart from the second block at a first temperature of at least one of the first block or the second block and contacts the second block at a second temperature of the at least one of the first block or the second block when the clamping device is applying the clamping force compressing the first sealing element between the first block and the second block.

2. The block fitting assembly of claim 1, wherein the first block is formed from a first material and the clamping device is formed from a second material, the first material having a greater coefficient of thermal expansion than the second material.

3. The block fitting assembly of claim 2, wherein the first block is formed from aluminum and the clamping device is formed from steel.

4. The block fitting assembly of claim 1, wherein at least a portion of the first sealing element is formed from a plastically deformable material configured to be axially deformed when compressed by the clamping force.

5. The block fitting assembly of claim 4, wherein the at least a portion of the first sealing element is formed from a metallic material.

6. The block fitting assembly of claim 1, wherein the first heel structure is formed monolithically with the first block.

7. The block fitting assembly of claim 1, wherein the clamping device is a fastener including a shaft, a head disposed at an end of the shaft, and a nut adjustable relative to the shaft, wherein the clamping force is applied between the head and the nut of the fastener.

8. The block fitting assembly of claim 1, wherein the clamping device is a fastener extending through each of a fastener aperture formed through the first block and a fastener aperture formed through the second block, wherein the first heel structure is disposed adjacent a perimeter of the fastener aperture of the first block.

9. The block fitting assembly of claim 8, wherein the first heel structure extends around at least a portion of the perimeter of the fastener aperture of the first block.

10. The block fitting assembly of claim 8, wherein a majority of the first heel structure is positioned to one side of a center of the fastener aperture of the first block.

11. The block fitting assembly of claim 10, wherein the one side of the center of the fastener aperture of the first block is either disposed towards the first sealing element with respect to the center of the fastener aperture or away from the first sealing element with respect to the center of the fastener aperture.

12. The block fitting assembly of claim 1, wherein the first heel structure is spaced apart from the second block when the first block is at a temperature below a threshold temperature, and wherein the first heel structure contacts the second block when the first block is at a temperature at or above the threshold temperature.

13. The block fitting assembly of claim 1, wherein the first heel structure is spaced apart from the second block when the second block is at a temperature below a threshold temperature, and wherein the first heel structure contacts the second block when the second block is at a temperature at or above the threshold temperature.

14. The block fitting assembly of claim 1, wherein at least a portion of the clamping force applied by the clamping device is transferred between the first block and the second block where the first heel structure contacts the second block.

15. The block fitting assembly of claim 14, wherein the at least a portion of the clamping force being transferred from the first block to the second block where the first heel structure contacts the second block causes a reduction in a portion of the clamping force transferred between the first block and the second block through the first sealing element.

16. The block fitting assembly of claim 1, wherein the first block forms a housing of an expansion valve.

17. The block fitting assembly of claim 1, wherein the block fitting assembly further comprises a second sealing element disposed between the first block and the second block, wherein the clamping force compresses the second sealing element between the first block and the second block in the axial direction of the block fitting assembly.

18. The block fitting assembly of claim 17, wherein the first heel structure is positioned towards one of the first sealing element or the second sealing element relative to a position of the clamping device.

19. A block fitting assembly comprising:
    a first block;
    a second block;
    a first sealing element disposed between the first block and the second block; and
    a clamping device applying a clamping force compressing the first sealing element between the first block and the second block in an axial direction of the block fitting assembly, wherein a first heel structure projects axially from one of the first block or the second block towards the other of the first block or the second block, wherein the first heel structure is spaced apart from the other of the first block or the second block at a first temperature of the first block and contacts the other of the first block or the second block at a second temperature of the first block.

20. The block fitting assembly of claim 19, further comprising:
   a third block; and
   a second sealing element disposed between the first block and the third block, the clamping force compressing the second sealing element between the first block and the third block in an axial direction of the block fitting assembly, wherein a second heel structure projects axially from one of the first block or the third block towards the other of the first block or the third block, wherein the second heel structure is spaced apart from or to contact the other of the first block or the third block depending on a temperature of the first block.

* * * * *